United States Patent
Im et al.

(10) Patent No.: US 12,530,073 B2
(45) Date of Patent: Jan. 20, 2026

(54) POWER MANAGEMENT DEVICE AND METHOD OF OPERATING THE SAME

(71) Applicant: ELECTRONICS AND TELECOMMUNICATIONS RESEARCH INSTITUTE, Daejeon (KR)

(72) Inventors: Jong Pil Im, Daejeon (KR); Seungeon Moon, Daejeon (KR); Jeong Hun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/544,995

(22) Filed: Dec. 19, 2023

(65) Prior Publication Data

US 2024/0219996 A1 Jul. 4, 2024

(30) Foreign Application Priority Data

Dec. 29, 2022 (KR) .......................... 10-2022-0188579

(51) Int. Cl.
*G06F 1/00* (2006.01)
*G06F 1/3296* (2019.01)
(52) U.S. Cl.
CPC ................................. *G06F 1/3296* (2013.01)
(58) Field of Classification Search
CPC .................................................. G06F 1/3296
See application file for complete search history.

(56) References Cited

U.S. PATENT DOCUMENTS

| 8,473,136 | B2 * | 6/2013 | Kato ...................... | B60L 50/62 |
| | | | | 180/65.21 |
| 9,618,963 | B2 | 4/2017 | Kang et al. | |
| 10,916,585 | B2 * | 2/2021 | El-Hinnawy .......... | H10B 63/84 |
| 11,515,466 | B2 * | 11/2022 | Safai ...................... | H02N 2/186 |

(Continued)

FOREIGN PATENT DOCUMENTS

KR   10-2015-0025035 A   3/2015

OTHER PUBLICATIONS

Chia-Lun Chang et al., "A Compact Multi-Input Thermoelectric Energy Harvesting System with 58.5% Power Conversion Efficiency and 32.4-mW Output Power Capability," 2014 International Symposium on Integrated Circuits (ISIC), 2014.

(Continued)

*Primary Examiner* — Mohammed H Rehman

(57) ABSTRACT

Disclosed is a power management device which includes a storage unit, a comparison control unit, a switching unit, and a power transmission control unit. The storage unit includes storage nodes. The comparison control unit outputs switch control signals based on results of comparing voltage levels of the storage nodes and threshold voltage pairs in a one-to-one correspondence. The switching unit includes switches connecting one of the storage nodes to a transmission node. A first switch is turned off when a voltage level of a first storage node is smaller than or equal to a first lower limit voltage. A second switch is immediately turned on when a voltage level of a second storage node is greater than or equal to a second upper limit voltage and when the first switch is turned off.

18 Claims, 11 Drawing Sheets

(56) References Cited

U.S. PATENT DOCUMENTS

| | | |
|---|---|---|
| 11,836,241 B1 * | 12/2023 | Unnikrishnan ......... G06F 21/41 |
| 12,254,369 B2 * | 3/2025 | Bergman ........... G06K 19/0723 |
| 2012/0101645 A1 | 4/2012 | Jun et al. |
| 2015/0066233 A1 | 3/2015 | Kang et al. |
| 2018/0364777 A1 | 12/2018 | Beyney et al. |
| 2022/0155336 A1 * | 5/2022 | Zhang ................... H02N 2/186 |
| 2023/0324970 A1 * | 10/2023 | Lu ............................ G06F 1/30 |
| | | 713/300 |

OTHER PUBLICATIONS

Michele Dini et al., "A Nanocurrent Power Management IC for Multiple Heterogeneous Energy Harvesting Sources," IEEE Transactions On Power Electronics, 2015.

Salvador Carreon-Bautista et al., "Boost Converter With Dynamic Input Impedance Matching for Energy Harvesting With Multi-Array Thermoelectric Generators," IEEE Transactions On Industrial Electronics, 2014.

Xuan-Dien Do et al., "Optimization of Piezoelectric Energy Harvesting Systems by Using a MPPT Method," 2014 IEEE Fifth International Conference on Communications and Electronics (ICCE), 2014.

* cited by examiner

POWER MANAGEMENT DEVICE AND METHOD OF OPERATING THE SAME

CROSS-REFERENCE TO RELATED APPLICATIONS

This application claims priority under 35 U.S.C. § 119 to Korean Patent Application No. 10-2022-0188579 filed on Dec. 29, 2022, in the Korean Intellectual Property Office, the disclosures of which are incorporated by reference herein in their entireties.

BACKGROUND

Embodiments of the present disclosure described herein relate to a technology for power management, and more particularly, relate to a power management device continuously supplying energies from a plurality of energy sources to a load device and an operating method of the power management device.

A power management device (or a power conversion device) should transmit energies from various types of energy sources to a load device as efficiently as possible. Nowadays, the power management device is being used in various low-power application environments.

To increase the efficiency of the power management device, various research results have been proposed. However, even though these research results are proposed, while energies from some of the energy sources are transmitted to the load device, energies from the others thereof are discarded, or it is difficult to commercialize the research results due to costs and the size or to implement the research results in various application environments.

SUMMARY

Embodiments of the present disclosure provide a power management device efficiently transmitting energies from various kinds of energy sources to a load device.

Embodiments of the present disclosure provide an operating method of the power management device.

According to an embodiment, a power management device includes a storage unit, a comparison control unit, a switching unit, and a power transmission control unit. The storage unit is connected to a plurality of energy sources and includes a plurality of storage nodes respectively charged by the plurality of energy sources. The comparison control unit outputs a plurality of switch control signals based on results of comparing voltage levels of the plurality of storage nodes and a plurality of threshold voltage pairs in a one-to-one correspondence. The switching unit includes a plurality of switches connecting one of the plurality of storage nodes to a transmission node based on the plurality of switch control signals. The power transmission control unit adjusts a voltage level of the transmission node so as to be output to an output node. The plurality of threshold voltage pairs include a first threshold voltage pair including a first upper limit voltage and a first lower limit voltage and a second threshold voltage pair including a second upper limit voltage and a second lower limit voltage. A first switch among the plurality of switches is turned off when a voltage level of a first storage node among the plurality of storage nodes is smaller than or equal to the first lower limit voltage. A second switch among the plurality of switches is immediately turned on when a voltage level of a second storage node among the plurality of storage nodes is greater than or equal to the second upper limit voltage and when the first switch is turned off.

According to an embodiment, in an operating method of a power management device. A plurality of storage nodes are charged by using a plurality of energy sources respectively connected to the plurality of storage nodes. When a voltage level of a first storage node among the plurality of storage nodes is greater than or equal to a first upper limit voltage, a first switch is turned on such that an energy stored at the first storage node is transferred to a transmission node. When the voltage level of the first storage node is smaller than or equal to a first lower limit voltage, the first switch is turned off. When a voltage level of a second storage node among the plurality of storage nodes is greater than or equal to a second upper limit voltage and when the first switch is turned off, a second switch is immediately turned on such that an energy stored at the second storage node is transferred to the transmission node.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

Figure 1:
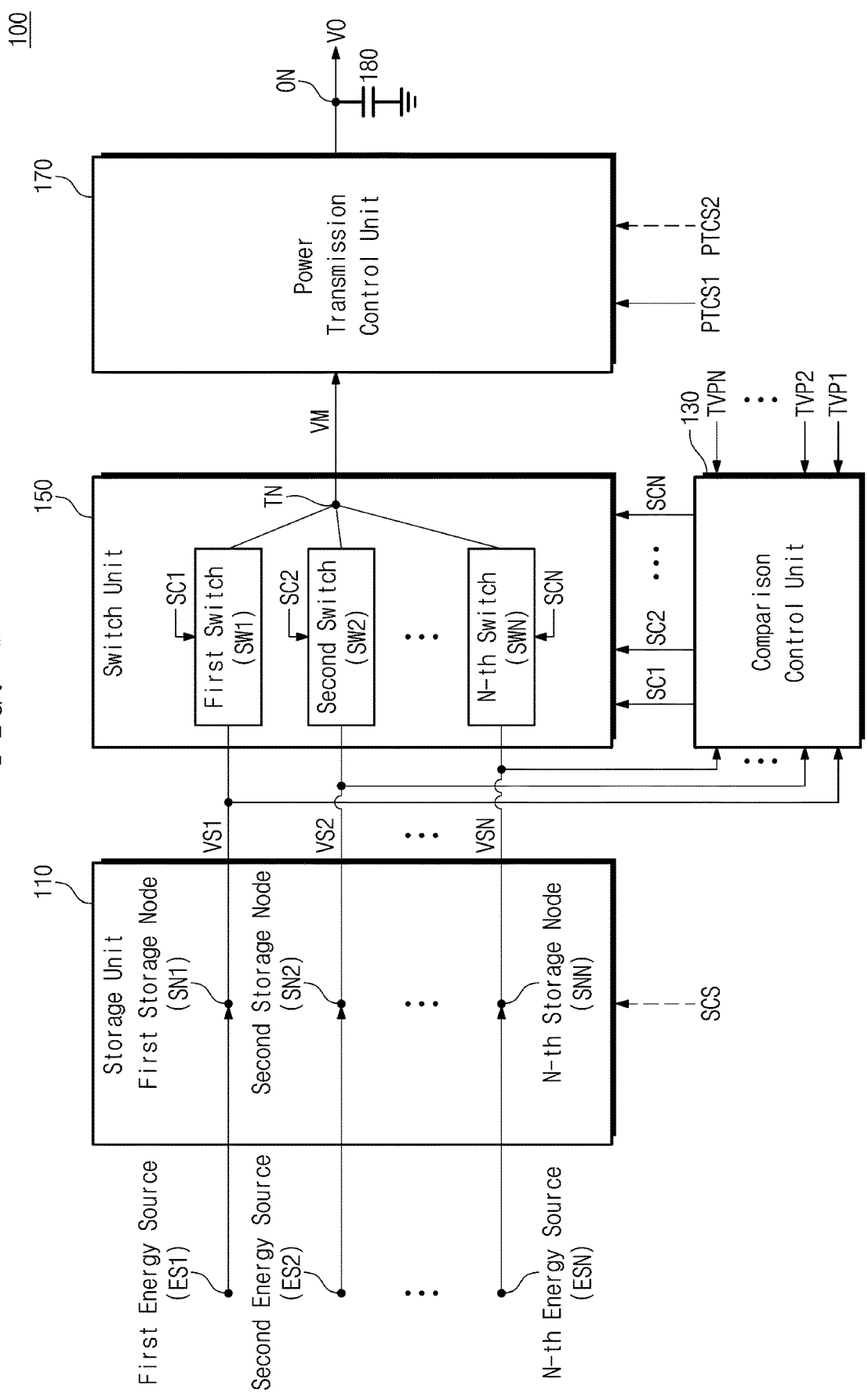
FIG. 1 is a block diagram illustrating a power management device according to an embodiment of the present disclosure.

FIG. 1 is a block diagram illustrating a power management device according to an embodiment of the present disclosure.

Referring to FIG. 1, a power management device 100 may include a storage unit 110, a comparison control unit 130, a switching unit 150, and a power transmission control unit 170.

The storage unit 110 may include a plurality of storage nodes and may be connected to a plurality of energy sources to charge the plurality of storage nodes, respectively.

In an embodiment, the plurality of energy sources may be different types of energy sources. For example, the plurality of energy sources may include a non-renewable energy such as oil, natural gas, coal, and nuclear power, and a renewable energy such as solar power, hydropower, wind power, geothermal power, and vibration.

In an embodiment, the plurality of storage nodes may include first to N-th storage nodes SN1, SN2, . . . , SNN (N being 3 or more), and the plurality of energy sources may include first to N-th energy sources ES1, ES2, . . . , ESN. The first to N-th storage nodes SN1, SN2, . . . , SNN (N being 3 or more) may be respectively connected to the first to N-th energy sources ES1, ES2, . . . , ESN and may respectively receive energies from the first to N-th energy sources ES1, ES2, . . . , ESN so as to be charged in a one-to-one correspondence.

The storage unit 110 may include a plurality of capacitors connected between the plurality of storage nodes and a ground voltage. For example, the plurality of capacitors may include first to N-th capacitors and may respectively store the energies transmitted from the first to N-th energy sources ES1, ES2, . . . , ESN.

In an embodiment, each of the plurality of capacitors may be implemented with a variable capacitor. In this case, the storage unit 110 may receive a storage control signal SCS from the outside and may adjust the capacitance of each of the plurality of capacitors based on the storage control signal SCS.

The comparison control unit 130 may output a plurality of switch control signals based on results of comparing voltage levels of the plurality of storage nodes and a plurality of threshold voltage pairs.

In an embodiment, the plurality of threshold voltage pairs may respectively correspond to the plurality of energy sources of different types and may be used to transmit the energies from the plurality energy sources to a load device of the power management device 100 around a maximum power point of each of the plurality of energies. For example, each of the plurality of threshold voltage pairs may include an upper limit voltage and a lower limit voltage; when the voltage level of each of the plurality of storage nodes is between the upper limit voltage and the lower limit voltage corresponding thereto, each of the energies stored at the plurality of storage nodes may be transmitted to the load device of the power management device 100.

In an embodiment, the plurality of threshold voltage pairs may include first to N-th threshold voltage pairs TVP1, TVP2, . . . , TVPN, and the comparison control unit 130 may output first to N-th switch control signals SC1, SC2, . . . , SCN based on results of comparing the voltage levels of the first to N-th storage nodes and the first to N-th threshold voltage pairs TVP1, TVP2, . . . , TVPN, respectively.

The switching unit 150 may include a plurality of switches, and the plurality of switches may connect one of the plurality of storage nodes to a transmission node TN based on the plurality of switch control signals.

In an embodiment, the plurality of switches may include first to N-th switches SW1, SW2, . . . , SWN, and the first to N-th switches SW1, SW2, . . . , SWN may connect one of the first to N-th storage nodes SN1, SN2, . . . , SNN to the transmission node TN based on the first to N-th switch control signals SC1, SC2, . . . , SCN.

The power transmission control unit 170 may adjust a voltage level of the transmission node TN and may output an output voltage VO to an output node ON.

In an embodiment, the power transmission control unit 170 may receive a first power transmission control signal PTCS1 from the outside and may increase or decrease the voltage level of the transmission node TN based on the first power transmission control signal PTCS1. For example, the power transmission control unit 170 may increase or decrease the voltage level of the transmission node TN such that the voltage level of the output voltage VO is substantially the same as a target voltage.

In an embodiment, the power transmission control unit 170 may include an inductor, and the inductor may be implemented with a variable inductor. In this case, the power transmission control unit 170 may further receive a second power transmission control signal PTCS2 and may adjust the inductance of the inductor based on the second power transmission control signal PTCS2.

In an embodiment, an output capacitor 180 for preventing a ripple of the output node ON may be connected between the output node ON and the ground voltage.

Through the above configuration, a power management device according to an embodiment of the present disclosure may store energies transmitted from a plurality of energy sources and may sequentially transmit the stored energies to a load device of the power management device. Even while one of the stored energies is transmitted to the load device, the remaining stored energies may not be discarded, and the power management device may manage the stored energies such that the stored energies are continuously transmitted to the load device around a relevant maximum power point. Accordingly, the power management device may efficiently transmit energies from various kinds of energy sources to the load device.

Figure 2:
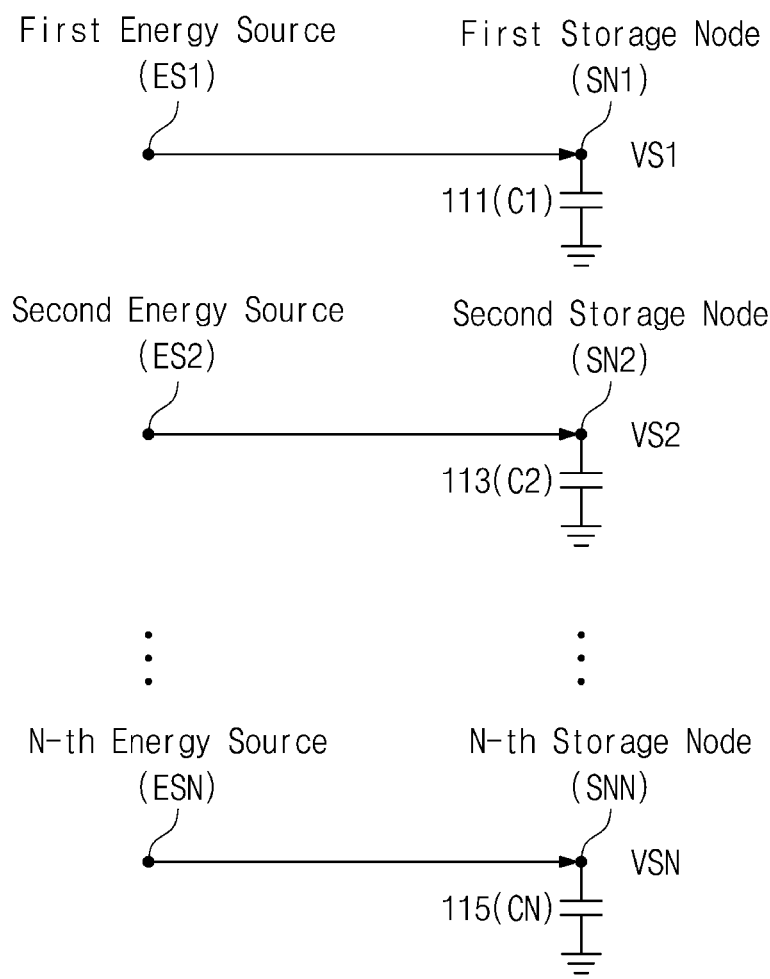
FIG. 2 is a block diagram illustrating an embodiment of a storage unit of FIG. 1.

FIG. 2 is a block diagram illustrating an embodiment of a storage unit of FIG. 1.

Referring to FIGS. 1 and 2, the storage unit 110 may include a plurality of storage nodes and a plurality of capacitors.

In an embodiment, the plurality of storage nodes may include the first to N-th storage nodes SN1, SN2, . . . , SNN, and the plurality of capacitors may include first to N-th capacitors 111, 113, . . . , 115.

In an embodiment, the first to N-th capacitors 111, 113, and 115 may be respectively connected between the first to N-th storage nodes SN1, SN2, . . . , SNN and the ground voltage. For example, the first capacitor 111 may be connected between the first storage node SN1 and the ground voltage, the second capacitor 113 may be connected between the second storage node SN2 and the ground voltage, and the N-th capacitor 115 may be connected between the N-th storage node SNN and the ground voltage.

In an embodiment, the plurality of storage nodes may be respectively connected to a plurality of energy sources and may store the plurality of storage nodes.

In an embodiment, the plurality of energy sources may include the first to N-th energy sources ES1, ES2, . . . , ESN, and the first to N-th energy sources ES1, ES2, . . . , ESN may be respectively connected to the first to N-th storage nodes SN1, SN2, . . . , SNN. For example, the first energy source ES1 may be connected to the first storage node SN1, the second energy source ES2 may be connected to the second storage node SN2, and the N-th energy source ESN may be connected to the N-th storage node SNN.

In an embodiment, the first to N-th capacitors 111, 113, and 115 may respectively have capacitances C1, C2, . . . , CN, and values of the capacitances C1, C2, . . . , CN may be set to be identical to each other or to be different from each other. For example, even though the plurality of energy sources correspond to different types or correspond to the same type, when the plurality of energy sources supply energies in different environments, the values of the capacitances C1, C2, . . . , CN may be set to be different from each other, but the present disclosure is not limited thereto.

Figure 3:
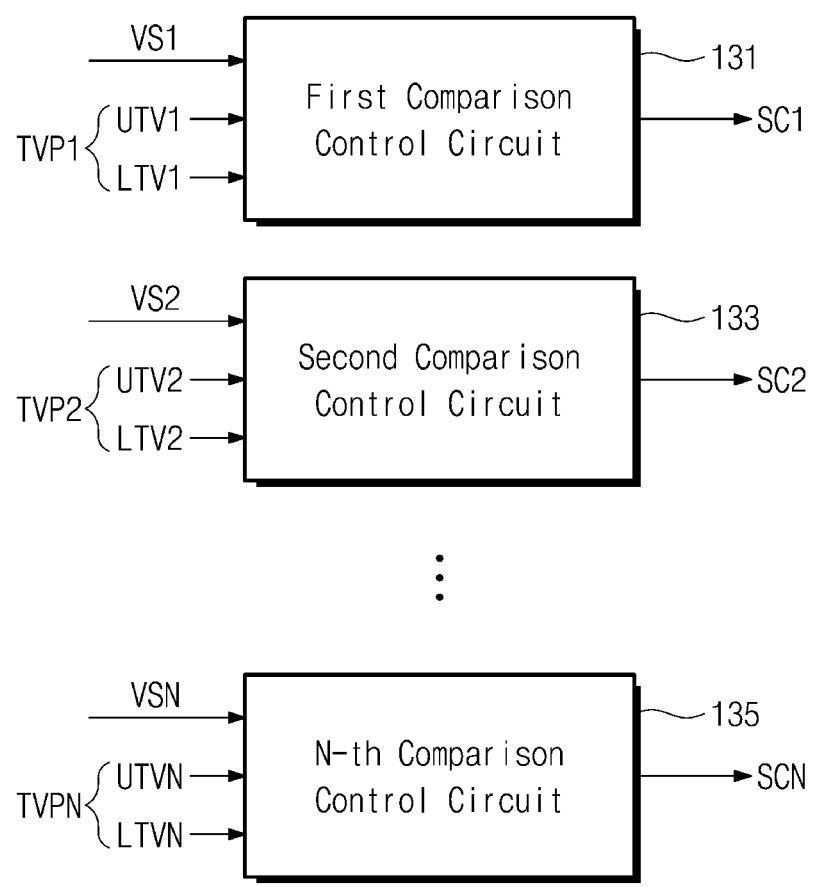
FIG. 3 is a block diagram illustrating an embodiment of a comparison control unit of FIG. 1.

FIG. 3 is a block diagram illustrating an embodiment of a comparison control unit of FIG. 1.

Referring to FIGS. 1 and 3, the comparison control unit 130 may include a plurality of comparison control circuits.

The plurality of comparison control circuits may output a plurality of switch control signals based on results of comparing voltage levels of a plurality of storage nodes and a plurality of threshold voltage pairs. Each of the plurality of threshold voltage pairs may include an upper limit voltage and a lower limit voltage.

In an embodiment, the plurality of comparison control circuits may include first to N-th comparison control circuits 131, 133, and 135. The plurality of threshold voltage pairs may include first to N-th threshold voltage pairs TVP1, TVP2, . . . , TVPN. The first threshold voltage pair TVP1 may include a first upper limit voltage UTV1 and a first lower limit voltage LTV1, the second threshold voltage pair TVP2 may include a second upper limit voltage UTV2 and a second lower limit voltage LTV2, and the N-th threshold voltage pair TVPN may include an N-th upper limit voltage UTVN and an N-th lower limit voltage LTVN.

In an embodiment, the first comparison control circuit 131 may receive a voltage VS1 of a first storage node and the first threshold voltage pair TVP1 and may output the first switch control signal SC1 based on results of comparing the voltage VS1 of the first storage node and the first threshold voltage pair TVP1. The second comparison control circuit 133 may receive a voltage VS2 of a second storage node and the second threshold voltage pair TVP2 and may output the second switch control signal SC2 based on results of comparing the voltage VS2 of the second storage node and the second threshold voltage pair TVP2. The N-th comparison control circuit 135 may receive a voltage VSN of an N-th storage node and the N-th threshold voltage pair TVPN and may output the N-th switch control signal SCN based on results of comparing the voltage VSN of the N-th storage node and the N-th threshold voltage pair TVPN.

Figure 4:
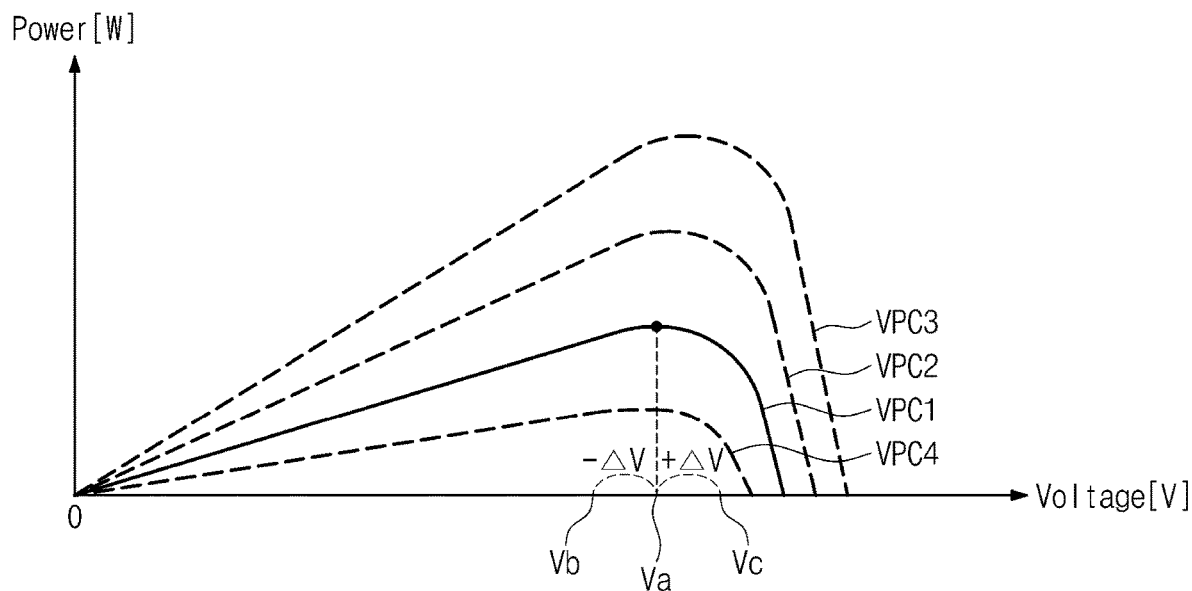
FIG. 4 is a diagram for describing a threshold voltage pair of FIG. 3.

FIG. 4 is a diagram for describing a threshold voltage pair of FIG. 3.

Referring to FIGS. 3 and 4, voltage-power curves VPC1, VPC2, VPC3, and VPC4 are illustrated. Each of the voltage-power curves VPC1, VPC2, VPC3, and VPC4 may indicate a relationship between a voltage of a relevant storage node and a power capable of being transmitted by the change in the voltage of the storage node.

In an embodiment, the voltage-power curves VPC1, VPC2, VPC3, and VPC4 may correspond to one of the plurality of energy sources. For example, when one of the plurality of energy sources supplies energies in different environments, the voltage-power curves VPC1, VPC2, VPC3, and VPC4 may indicate voltage-power curves varying in the respective environments.

In a specific environment, the voltage-power curve VPC1 marked by a solid line may be defined with respect to a specific energy source. In this case, a voltage Va may correspond to a maximum power point.

In an embodiment, an upper limit voltage and a lower limit voltage may be determined based on the maximum power point. For example, a voltage Vc whose magnitude is greater than the voltage Va as much as a given magnitude ΔV may be set as the upper limit voltage of the specific energy source, and a voltage Vb whose magnitude is smaller than the voltage Va as much as the given magnitude ΔV may be set as the lower limit voltage of the specific energy source. However, this is only an example.

In an embodiment, one threshold voltage pair may be set for each energy source, and the threshold voltage pair may include the upper limit voltage and the lower limit voltage. For example, in the embodiment illustrated in FIG. 1, the first threshold voltage pair TVP1 including a first upper limit voltage and a first lower limit voltage may be set for the first energy source ES1, the second threshold voltage pair TVP2 including a second upper limit voltage and a second lower limit voltage may be set for the second energy source ES2, and the N-th threshold voltage pair TVPN including an N-th upper limit voltage and an N-th lower limit voltage may be set for the N-th energy source ESN. For example, the first threshold voltage pair TVP1 may be associated with a first maximum power point of the first energy source ES1, the second threshold voltage pair TVP2 may be associated with a second maximum power point of the second energy source ES2, and the N-th threshold voltage pair TVPN may be associated with an N-th maximum power point of the N-th energy source ESN.

Figure 5:
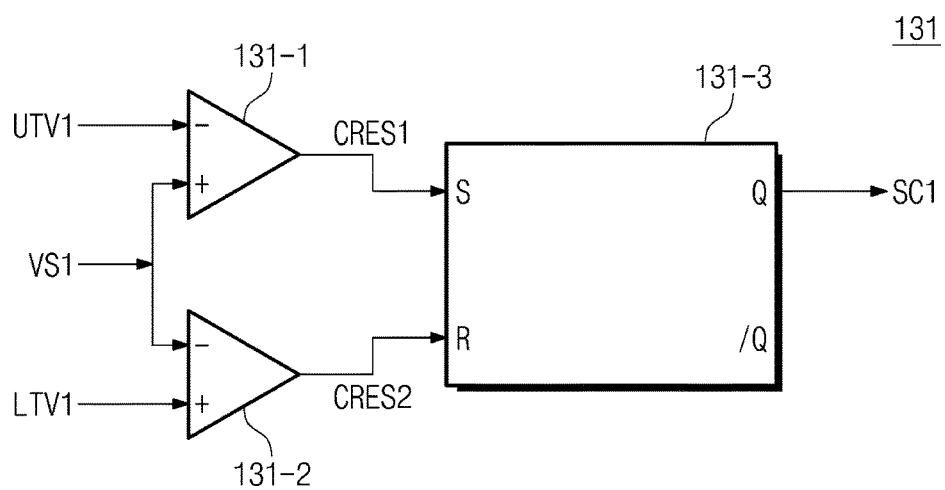
FIG. 5 is a block diagram illustrating an embodiment of a comparison control circuit of FIG. 3.
Figure 6:
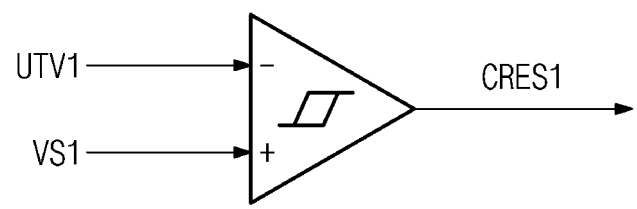
FIG. 6 is a block diagram illustrating an embodiment of a comparator of FIG. 5.

FIG. 5 is a block diagram illustrating an embodiment of a first comparison control circuit of FIG. 3. FIG. 6 is a block diagram illustrating an embodiment of a comparator of FIG. 5.

Referring to FIGS. 1, 3, and 5, the first comparison control circuit 131 may include a first comparator 131-1, a second comparator 131-2, and an SR latch 131-3.

The first comparator 131-1 may compare a voltage level of the first storage node SN1 (e.g., the voltage level of the voltage VS1) and a voltage level of the first upper limit voltage UTV1 and may output a first comparison result CRES1.

The second comparator 131-2 may compare the voltage level of the first storage node SN1 and a voltage level of the first lower limit voltage LTV1 and may output a second comparison result CRES2.

The SR latch 131-3 may output the first switch control signal SC1 based on the first comparison result CRES1 and the second comparison result CRES2.

For example, when the voltage level VS1 is higher than the voltage level of the first upper limit voltage UTV1, the first comparison result CRES1 may indicate a first logical value (e.g., logic "1"), and the second comparison result CRES2 may indicate a second logical value (e.g., logic "0"); in this case, the SR latch 131-3 may output the first logical value as the first switch control signal SC1 through an output terminal "Q". For example, when the voltage level VS1 is lower than the voltage level of the first lower limit voltage LTV1, the second comparison result CRES2 may indicate the first logical value, and the first comparison result CRES1 may indicate the second logical value; in this case, the SR latch 131-3 may output the second logical value as the first switch control signal SC1 through the output terminal "Q". When the voltage level VS1 is between the voltage level of the first upper limit voltage UTV1 and the voltage level of the first lower limit voltage LTV1, each of the first comparison result CRES1 and the second comparison result CRES2 may indicate the second logical value; in this case, the SR latch 131-3 may maintain a value of the first switch control signal SC1 previously output through the output terminal "Q".

In an embodiment, when the voltage level of the first storage node SN1 is higher than the voltage level of the first upper limit voltage UTV1, the SR latch 131-3 may output the first switch control signal SC1 allowing the first switch SW1 to be turned on; when the voltage level of the first storage node SN1 is lower than the voltage level of the first lower limit voltage LTV1, the SR latch 131-3 may output the first switch control signal SC1 allowing the first switch SW1 to be turned off.

The second comparison control circuit 133 and the N-th comparison control circuit 135 of FIG. 3 may also be implemented in the same scheme as the first comparison control circuit 131.

Referring to FIGS. 5 and 6, each of the first comparator 131-1 and the second comparator 131-2 maybe implemented with a Schmitt trigger comparator with a hysteresis characteristic. For example, the first comparator 131-1 maybe implemented to be insensitive to the noise from the outside in the process of comparing the voltage level VS1 of the first storage node SN1 and the voltage level of the first upper limit voltage UTV1. This may mean that the first comparator 131-1 is implemented such that the first comparison control circuit 131 stably outputs the first comparison result CRES1.

Figure 7:
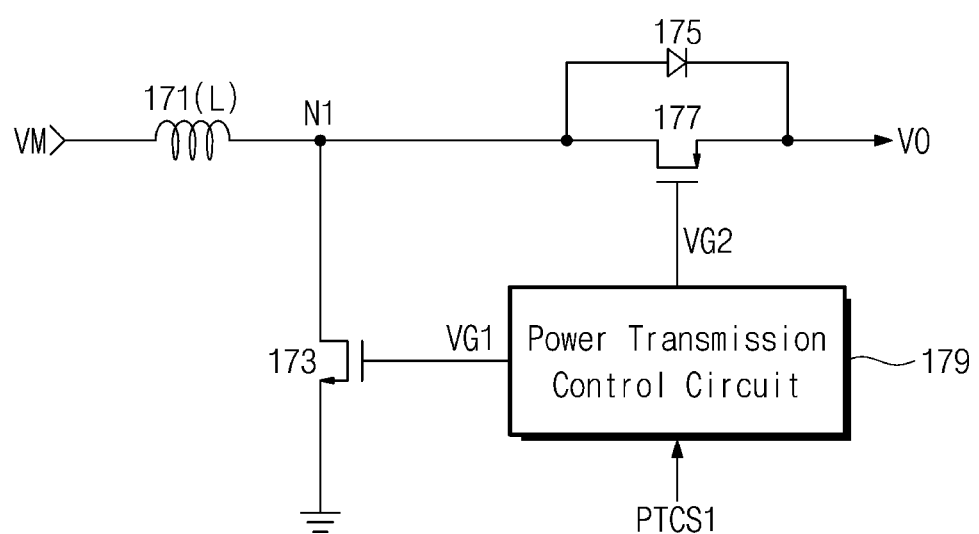
FIG. 7 is a block diagram illustrating an embodiment of a power transmission control unit of FIG. 1.

FIG. 7 is a block diagram illustrating an embodiment of a power transmission control unit of FIG. 1.

Referring to FIGS. 1 and 7, the power transmission control unit 170 may include an inductor 171, an NMOS transistor 173, a diode 175, a PMOS transistor 177, and a power transmission control circuit 179.

The inductor 171 may be connected between the transmission node (e.g., TN of FIG. 1) and a first node N1. The NMOS transistor 173 may be connected between the first node N1 and the ground voltage. The diode 175 and the PMOS transistor 177 may be connected in parallel between the first node N1 and the output node (e.g., ON of FIG. 1). The power transmission control circuit 179 may provide gate signals VG1 and VG2 to gate terminals of the NMOS transistor 173 and the PMOS transistor 177 based on the first power transmission control signal PTCS1 from the outside, respectively.

In an embodiment, the power transmission control unit 170 may be implemented with a "buck-boost converter" and may adjust a duty ratio of the buck-boost converter based on the first power transmission control signal PTCS1 such that the voltage level of the transmission node TN increases or decreases. For example, the power transmission control unit 170 may increase the voltage level of the transmission node TN when the voltage level of the transmission node TN is lower than a target voltage and may decrease the voltage level of the transmission node TN when the voltage level of the transmission node TN is higher than the target voltage. The target voltage may be set to have a voltage level that a load device connected to the output node ON requires.

Figure 8:
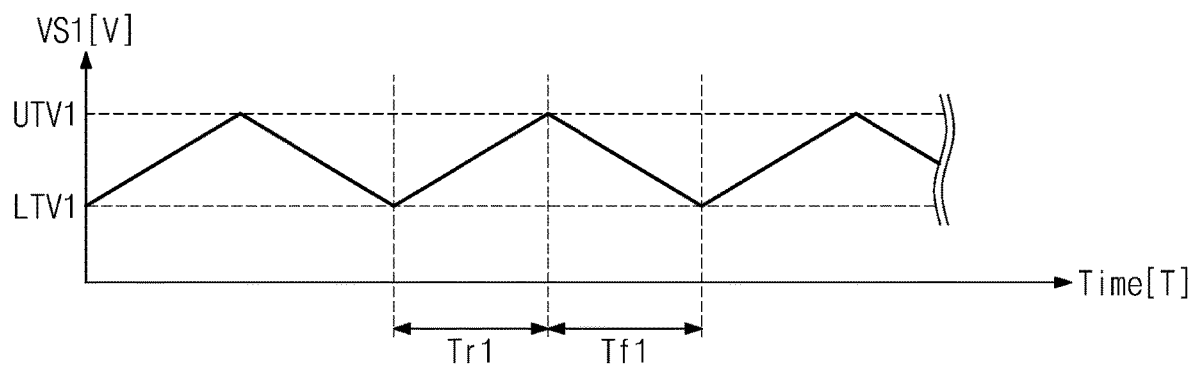
FIGS. 8, 9, and 10 are graphs for describing voltage levels of one or more storage nodes of FIG. 1.
Figure 9:
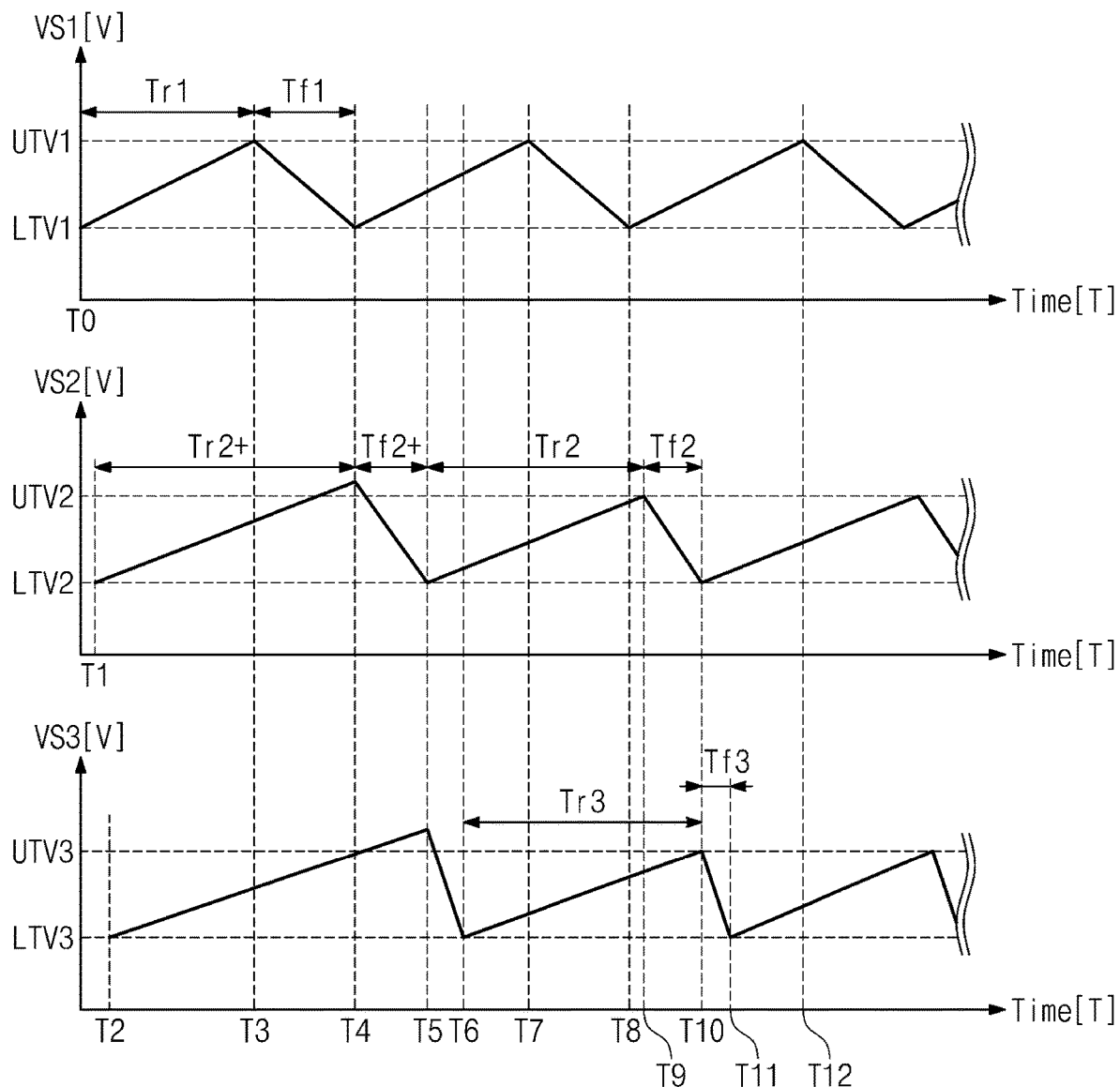
Figure 10:
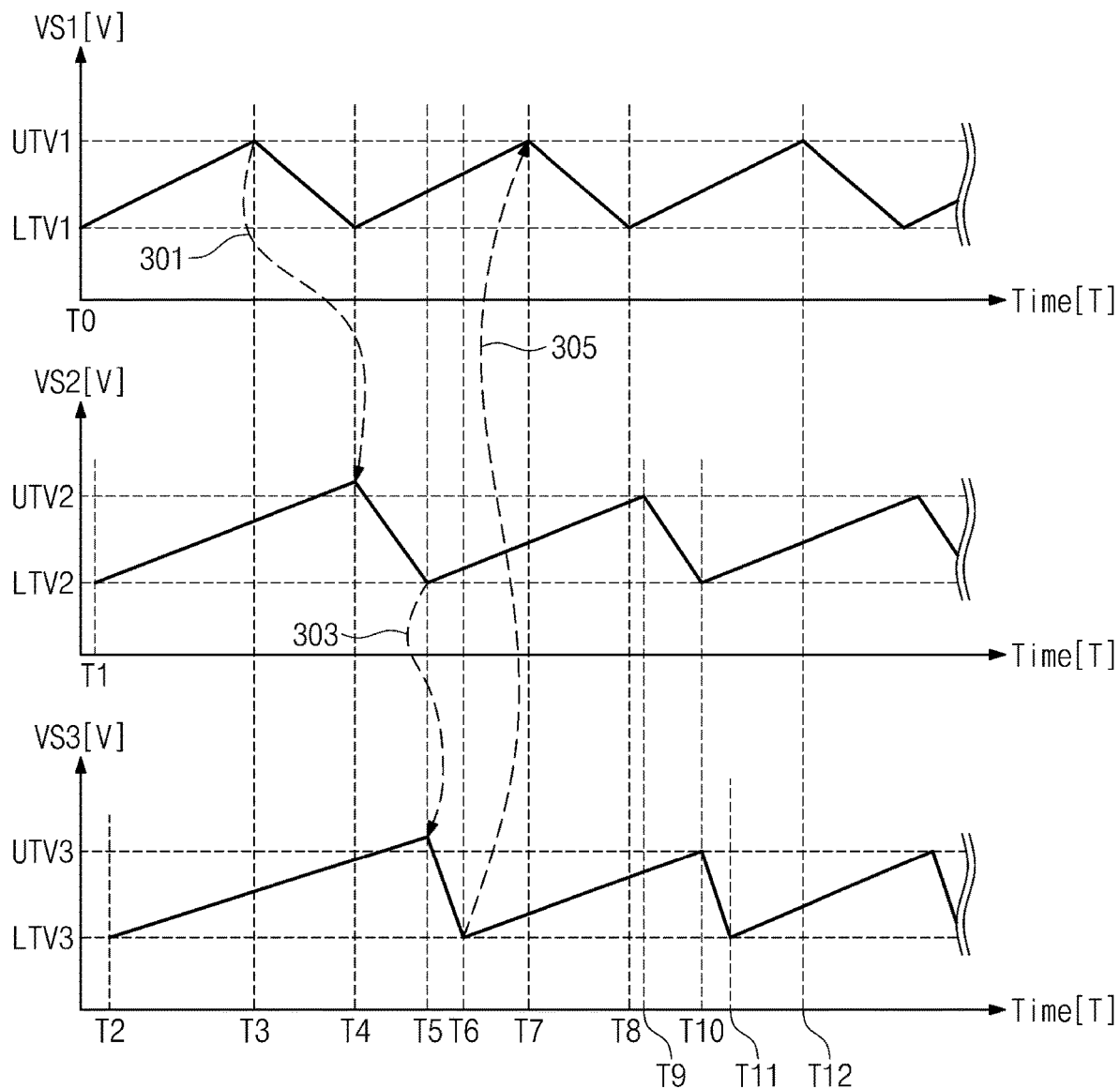
Figure 11:
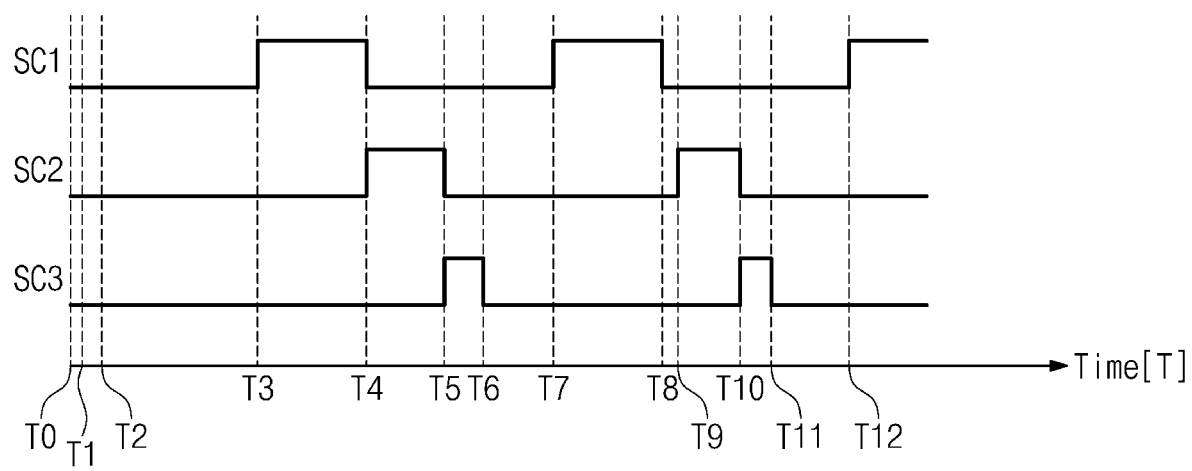
FIG. 11 is a diagram for describing an embodiment of switch control signals of FIG. 1.

FIGS. 8, 9, and 10 are graphs for describing voltage levels of one or more storage nodes of FIG. 1. FIG. 11 is a diagram for describing an embodiment of switch control signals of FIG. 1.

Referring to FIGS. 1 and 8, a voltage level of the first storage node SN1 (i.e., a voltage level of the voltage VS1) may be controlled to change between the first upper limit voltage UTV1 and the first lower limit voltage LTV1. For example, when the first switch SW1 is turned off, the voltage level of the first storage node SN1 may increase by the energy provided from the first energy source ES1; when the first switch SW1 is turned on, the voltage level of the first storage node SN1 may decrease.

In an embodiment, when the voltage level of the first storage node SN1 becomes greater than the first upper limit voltage UTV1, the first switch SW1 may be turned on based on the first switch control signal SC1, and thus, the voltage level of the first storage node SN1 may decrease; when the voltage level of the first storage node SN1 becomes smaller than the first lower limit voltage LTV1, the first switch SW1 may be turned off based on the first switch control signal SC1, and thus, the voltage level of the first storage node SN1 may increase. However, this is only an example.

In an embodiment, the voltage level of the first storage node SN1 may increase (or rise) during a time period Tr1 and may decrease (or fall) during a time period Tf1. In this case, a length of each of the time period Tr1 and the time period Tf1 may be determined based on the first capacitor 111 connected between the first storage node SN1 and the ground voltage and the inductor 171 connected between the transmission node TN and the first node N1. For example, the length of each of the time period Tr1 and the time period Tf1 may increase as the capacitance of the first capacitor 111 increases and the inductance of the inductor 171 decreases; the length of each of the time period Tr1 and the time period Tf1 may decrease as the capacitance of the first capacitor 111 decreases and the inductance of the inductor 171 increases.

Although not illustrated in FIG. 8, voltage levels of the second storage node SN2 and the N-th storage node SNN may also change as in the first storage node SN1.

Referring to FIGS. 1, 8, 9, 10, and 11, the number of energy sources may be three (e.g., N being "3"). At points in time T0, T1, and T2, the first switch SW1, the second switch SW2, and the third switch SW3 among a plurality of switches may be in a turn-off state; in this case, as the energies from the energy sources ES1, ES2, and ES3 are supplied, voltage levels of the first storage node SN1, the second storage node SN2, and the third storage node SN3 (i.e., voltage levels of the voltages VS1, VS2, and VS3) may increase.

At a point in time T3 when the voltage level of the first storage node SN1 is greater than or equal to the first upper limit voltage UTV1, the first switch SW1 may be turned on, and the voltage level of the first storage node SN1 may decrease until a point in time T4. The voltage levels of the second storage node SN2 and the third storage node SN3 may increase.

At the point in time T4 when the voltage level of the first storage node SN1 is smaller than or equal to the first lower limit voltage LTV1, the first switch SW1 may be turned off. The second switch SW2 may be immediately turned on when the voltage level of the second storage node SN2 is greater than or equal to the second upper limit voltage UTV2 and when the first switch SW1 is turned off (e.g., 301), and the voltage level of the second storage node SN2 may decrease. The voltage levels of the first storage node SN1 and the third storage node SN3 may increase.

At a point in time T5 when the voltage level of the second storage node SN2 is smaller than or equal to the second lower limit voltage LTV2, the second switch SW2 may be turned off. The third switch SW3 may be immediately turned on when the voltage level of the third storage node SN3 is greater than or equal to the third upper limit voltage UTV3 and when the second switch SW2 is turned off (e.g., 303), and the voltage level of the third storage node SN3 may decrease. The voltage levels of the first storage node SN1 and the second storage node SN2 may increase.

At a point in time T6 when the voltage level of the third storage node SN3 is smaller than or equal to the third lower limit voltage LTV3, the third switch SW3 may be turned off. Because the first switch SW1 is immediately turned on when the voltage level of the first storage node SN1 is greater than or equal to the first upper limit voltage UTV1 and when the third switch SW3 is turned off, when the voltage level of the first storage node SN1 is smaller than the first upper limit voltage UTV1 or the third switch SW3 is turned on, the first switch SW1 may maintain the turn-off state. At a point in time T7, the first switch SW1 may be turned on, and the voltage level of the first storage node SN1 may decrease from the point in time T7. The voltage levels of the second storage node SN2 and the third storage node SN3 may increase. As in the above description, at point in times T8, T9, T10, T11, and T12, as the first switch SW1, the second switch SW2, and the third switch SW3 are turned on/turned off, the voltage levels of the first storage node SN1, the second storage node SN2, and the third storage node SN3 (e.g., the voltage levels of the voltages VS1, VS2, and VS3) may be controlled.

As illustrated in FIG. 9, the voltage level of the first storage node SN1 may rise during the first time period Tr1 and may fall during the second time period Tf1. The voltage level of the second storage node SN2 may rise during a third time period Tr2+ and may fall during a fourth time period Tf2+. The voltage level of the third storage node SN3 may rise during a fifth time period Tr3 and may fall during a sixth time period Tf3. In this case, the length of the first time period Tr1 may be longer than a sum of lengths of the fourth time period Tf2 and the sixth time period Tf3. As described with reference to FIGS. 1 and 8, the first time period Tr1, the second time period Tf1, the third time period Tr2, the fourth time period Tf2, the fifth time period Tr3, and the sixth time period Tf3 may be adjusted by adjusting values of variable capacitors and a variable inductor included in the power management device 100.

In an embodiment, a plurality of storage nodes of FIG. 1 may include the first to N-th storage nodes SN1, SN2, . . . , SNN (N being 3 or more), and a length of a time period where the voltage level of the first storage node SN1 rises may be greater than a sum of lengths of time periods where the remaining storage nodes SN2, . . . , SNN other than the first storage node SN1 from among the plurality of storage nodes fall.

Figure 12:
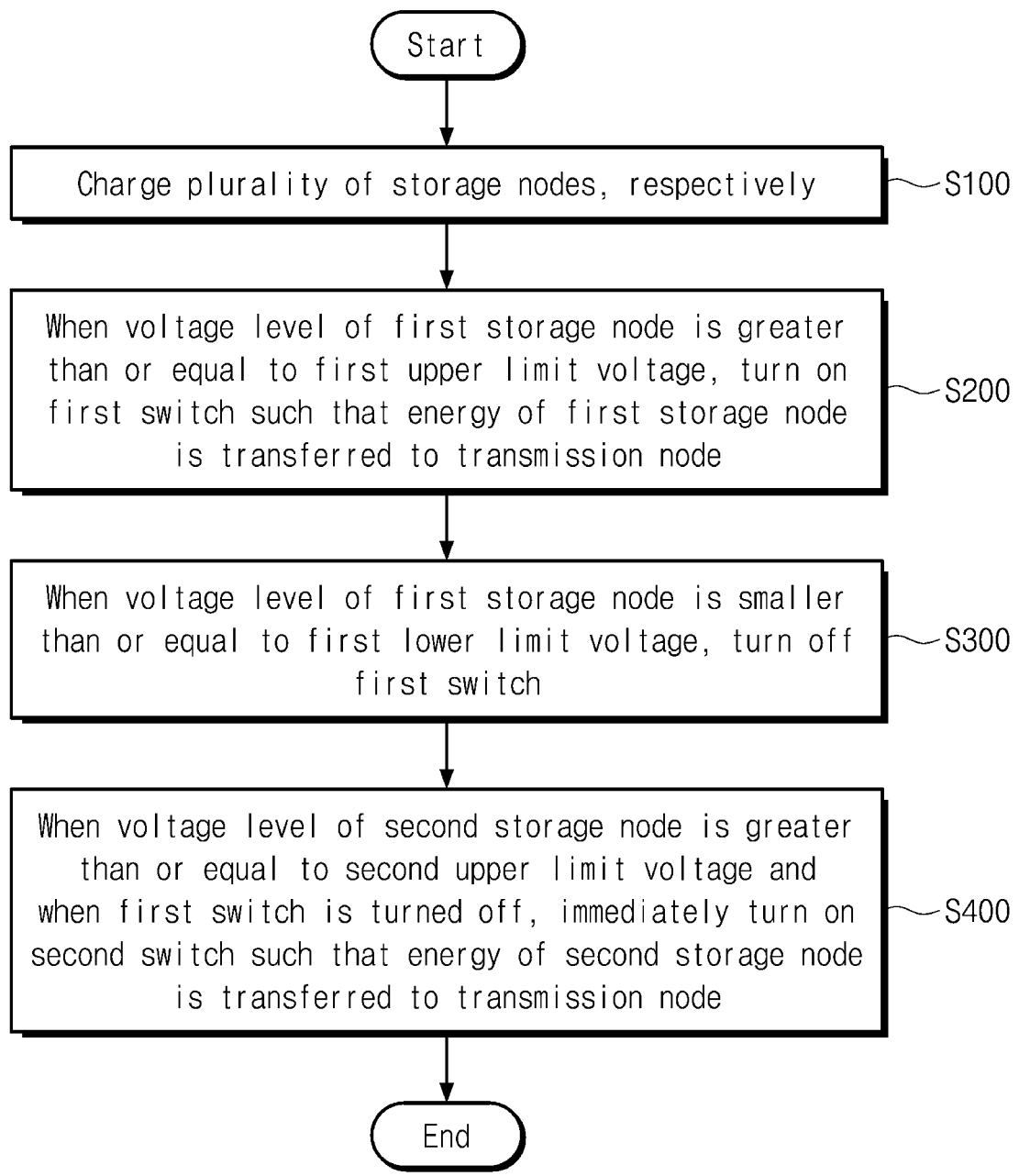
FIG. 12 is a flowchart illustrating an operating method of a power management device according to an embodiment of the present disclosure.

FIG. 12 is a flowchart illustrating an operating method of a power management device according to an embodiment of the present disclosure.

Referring to FIGS. 1 and 12, in the operating method of the power management device 100, the storage unit 110 may be connected to a plurality of energy sources (e.g., ES1, ES2, . . . , ESN) and may charge the plurality of storage nodes (e.g., SN1, SN2, . . . , SNN) independently of each other (S100).

When a voltage level of a first storage node (e.g., SN1) among the plurality of storage nodes is greater than or equal to a first upper limit voltage, the switching unit 150 may turn on a first switch (e.g., SW1) and may transfer the energy stored at the first storage node to a transmission node (e.g., TN) (S200).

When the voltage level of the first storage node among the plurality of storage nodes is smaller than or equal to a first lower limit voltage, the switching unit 150 may turn off the first switch (e.g., SW1) (S300).

When a voltage level of a second storage node (e.g., SN2) among the plurality of storage nodes is greater than or equal to a second upper limit voltage and when the first switch is turned off, the switching unit 150 may immediately turn on a second switch such that the energy stored at the second storage node is transferred to the transmission node (S400).

In an embodiment, when a voltage level of a third storage node (e.g., SNN) among the plurality of storage nodes is greater than or equal to a third upper limit voltage and when the second switch is turned off, the switching unit 150 may immediately turn on a third switch (e.g., SNN) such that the energy stored at the third storage node is transferred to the transmission node.

In an embodiment, the plurality of storage nodes may include first to N-th storage nodes, and a length of a time period where the voltage level of the first storage node rises may be greater than a sum of lengths of time periods where voltage levels of the remaining storage nodes other than the first storage node among the plurality of storage nodes fall.

In an embodiment, lengths of time periods where the voltage levels of the first to N-th storage nodes increase and decrease may be controlled by adjusting capacitances of capacitors connected between the plurality of storage nodes and the ground voltage and an inductance of an inductor connected to the transmission node.

In an embodiment, the voltage level of the transmission node may be adjusted to be substantially the same as a target voltage.

In an embodiment, a first threshold voltage pair may include a first upper limit voltage and a first lower limit voltage, a second threshold voltage pair may include a second upper limit voltage and a second lower limit voltage, and a third threshold voltage pair may include a third upper limit voltage and a third lower limit voltage. The plurality of energy sources may include a first energy source, a second energy source, and a third energy source. The first threshold voltage pair may be associated with a first maximum power point of the first energy source, the second threshold voltage pair may be associated with a second maximum power point of the second energy source, and the third threshold voltage pair may be associated with a third maximum power point of the third energy source.

Figure 13:
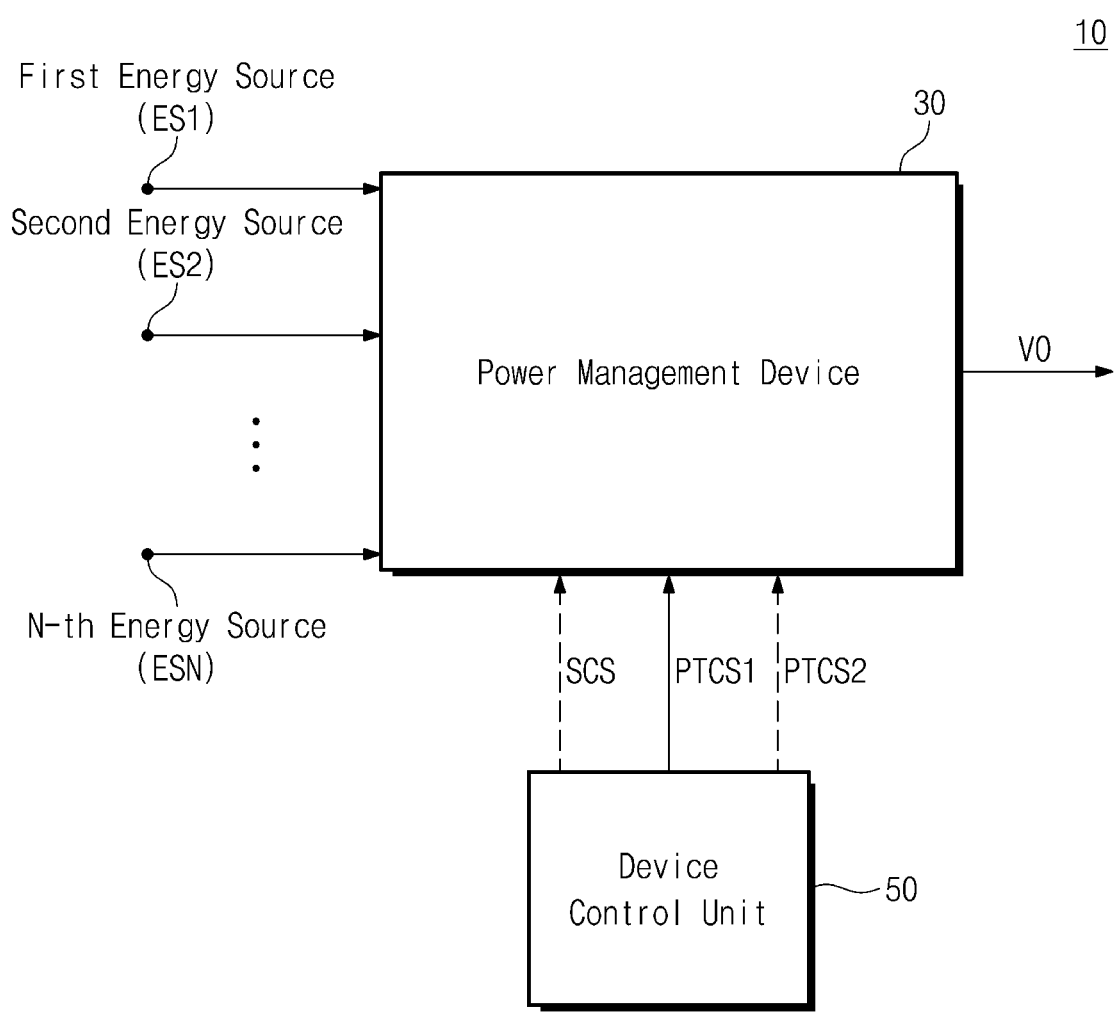
FIG. 13 is a block diagram illustrating a power management system including a power management device according to an embodiment of the present disclosure.

FIG. 13 is a block diagram illustrating a power management system including a power management device according to an embodiment of the present disclosure.

Referring to FIG. 13, a power management system 10 may include a power management device 30 and a device control unit 50.

The power management system 10 maybe an energy harvesting system that finely harvests energies generated from natural energy sources, such as sunlight, vibration, heat, and wind, and converts the energies into an electrical energy. In an embodiment, the power management system 10 maybe mainly used in low-power devices such as a small-sized electronic device of a wearable network or a vehicle, a mobile device, and a wearable device.

The power management device 30 may output the output voltage VO based on energies from the first energy source ES1, the second energy source ES2, . . . , the N-th energy source ESN (N being 3 or more). In an embodiment, the power management device 30 may correspond to the power management device 100 of FIG. 1.

The device control unit 50 may provide the power management device 30 with various control signals SCS, PTCS1, and PTCS2 for controlling the power management device 30.

In an embodiment, the control signal SCS may be used to adjust capacitances of variable capacitors included in the power management device 30, the control signal PTCS1 may be used to increase or decrease a voltage level of a specific node included in the power management device 30, and the control signal PTCS2 may be used to adjust an inductance of a variable inductor included in the power management device 30.

A power management device according to an embodiment of the present disclosure may store energies transmitted from a plurality of energy sources and may sequentially transmit the stored energies to a load device of the power management device. Even while one of the stored energies is transmitted to the load device, the remaining stored energies may not be discarded, and the power management device may manage the stored energies such that the stored energies are continuously transmitted to the load device around a relevant maximum power point. Accordingly, the power management device may efficiently transmit energies from various kinds of energy sources to the load device.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A power management device comprising:
a storage unit connected to a plurality of energy sources and including a plurality of storage nodes respectively charged by the plurality of energy sources;
a comparison control unit configured to output a plurality of switch control signals based on results of comparing voltage levels of the plurality of storage nodes and a plurality of threshold voltage pairs in a one-to-one correspondence;
a switching unit including a plurality of switches connecting one of the plurality of storage nodes to a transmission node based on the plurality of switch control signals; and
a power transmission control unit configured to adjust a voltage level of the transmission node so as to be output to an output node,
wherein the plurality of threshold voltage pairs include a first threshold voltage pair including a first upper limit voltage and a first lower limit voltage, a second threshold voltage pair including a second upper limit voltage and a second lower limit voltage, and a third threshold voltage pair including a third upper limit voltage and a third lower limit voltage,
wherein a first switch among the plurality of switches is turned off when a voltage level of a first storage node among the plurality of storage nodes is smaller than or equal to the first lower limit voltage,
wherein a second switch among the plurality of switches is immediately turned on when a voltage level of a second storage node among the plurality of storage nodes is greater than or equal to the second upper limit voltage and when the first switch is turned off, and
wherein a third switch among the plurality of switches is immediately turned on when a voltage level of a third storage node among the plurality of storage nodes is greater than or equal to the third upper limit voltage and when the second switch is turned off.

2. The power management device of claim 1, wherein the first switch is immediately turned on when the voltage level of the first storage node is greater than or equal to the first upper limit voltage and when the third switch is turned off.

3. The power management device of claim 1, wherein the second switch maintains a turn-off state when the voltage level of the second storage node is smaller than the second upper limit voltage or when the first switch is turned on.

4. The power management device of claim 1, wherein the plurality of storage nodes include the first storage node, the second storage node, and a third storage node,
wherein the voltage level of the first storage node rises during a first time period and falls during a second time period,
wherein the voltage level of the second storage node rises during a third time period and falls during a fourth time period,
wherein a voltage level of the third storage node rises during a fifth time period and falls during a sixth time period, and
wherein a length of the first time period is greater than a sum of lengths of the fourth time period and the sixth time period.

5. The power management device of claim 1, wherein the plurality of storage nodes include a first to an N-th storage node (N being 3 or more), and
wherein a length of a time period where the voltage level of the first storage node rises is greater than a sum of lengths of time periods where voltage levels of remaining storage nodes other than the first storage node among the plurality of storage nodes fall.

6. The power management device of claim 1, wherein the comparison control unit includes:
a first comparison control circuit configured to output a first switch control signal among the plurality of switch control signals based on the voltage level of the first storage node, the first upper limit voltage, and the first lower limit voltage.

7. The power management device of claim 1, wherein the power transmission control unit includes:
an inductor connected between the transmission node and a first node;
an NMOS transistor connected between the first node and a ground voltage;
a PMOS transistor and a diode connected in parallel between the first node and the output node; and
a power transmission control circuit configured to provide gate signals to gate terminals of the NMOS transistor and the PMOS transistor based on a power transmission control signal, respectively.

8. The power management device of claim 7, wherein the storage unit includes:
a first capacitor connected between the first storage node and the ground voltage,
wherein the voltage level of the first storage node rises during a first time period and falls during a second time period, and
wherein a length of each of the first time period and the second time period is determined based on the first capacitor and the inductor.

9. The power management device of claim 1, wherein the first threshold voltage pair is associated with a first maximum power point of a first energy source among the plurality of energy sources, and
wherein the second threshold voltage pair is associated with a second maximum power point of a second energy source among the plurality of energy sources.

10. The power management device of claim 9, wherein the first upper limit voltage and the first lower limit voltage are determined based on the first maximum power point, and
wherein the second upper limit voltage and the second lower limit voltage are determined based on the second maximum power point.

11. A power management device comprising:
a storage unit connected to a plurality of energy sources and including a plurality of storage nodes respectively charged by the plurality of energy sources;
a comparison control unit configured to output a plurality of switch control signals based on results of comparing voltage levels of the plurality of storage nodes and a plurality of threshold voltage pairs in a one-to-one correspondence;

a switching unit including a plurality of switches connecting one of the plurality of storage nodes to a transmission node based on the plurality of switch control signals; and a power transmission control unit configured to adjust a voltage level of the transmission node so as to be output to an output node, wherein the plurality of threshold voltage pairs include a first threshold voltage pair including a first upper limit voltage and a first lower limit voltage and a second threshold voltage pair including a second upper limit voltage and a second lower limit voltage, wherein a first switch among the plurality of switches is turned off when a voltage level of a first storage node among the plurality of storage nodes is smaller than or equal to the first lower limit voltage, wherein a second switch among the plurality of switches is immediately turned on when a voltage level of a second storage node among the plurality of storage nodes is greater than or equal to the second upper limit voltage and when the first switch is turned off, and wherein the comparison control circuit includes:

a first comparator configured to compare the voltage level of the first storage node and a voltage level of the first upper limit voltage to output a first comparison result;

a second comparator configured to compare the voltage level of the first storage node and a voltage level of the first lower limit voltage to output a second comparison result; and an SR latch configured to output a first switch control signal among the plurality of switch control signals based on the first comparison result and the second comparison result.

12. The power management device of claim 11, wherein the SR latch is configured to:

when the voltage level of the first storage node is greater than the voltage level of the first upper limit voltage, output the first switch control signal allowing the first switch to be turned on; and when the voltage level of the first storage node is smaller than the voltage level of the first lower limit voltage, output the first switch control signal allowing the first switch to be turned off.

13. The power management device of claim 12, wherein each of the first comparator and the second comparator includes a Schmitt trigger comparator.

14. An operating method of a power management device, the method comprising:

charging a plurality of storage nodes by using a plurality of energy sources respectively connected to the plurality of storage nodes;

when a voltage level of a first storage node among the plurality of storage nodes is greater than or equal to a first upper limit voltage, turning on a first switch such that an energy stored at the first storage node is transferred to a transmission node;

when the voltage level of the first storage node is smaller than or equal to a first lower limit voltage, turning off the first switch; and when a voltage level of a second storage node among the plurality of storage nodes is greater than or equal to a second upper limit voltage and when the first switch is turned off, immediately turning on a second switch such that an energy stored at the second storage node is transferred to the transmission node, wherein the plurality of storage nodes include a first to an N-th storage node (N being 3 or more), and wherein a length of a time period where the voltage level of the first storage node rises is greater than a sum of lengths of time periods where voltage levels of remaining storage nodes other than the first storage node among the plurality of storage nodes fall.

15. The method of claim 14, further comprising:

when a voltage level of a third storage node among the plurality of storage nodes is greater than or equal to a third upper limit voltage and when the second switch is turned off, immediately turning on a third switch such that an energy stored at the third storage node is transferred to the transmission node.

16. The method of claim 14, further comprising:

adjusting capacitances of capacitors connected between the plurality of storage nodes and a ground voltage and an inductance of an inductor connected to the transmission node to control lengths of time periods where voltage levels of the first to N-th storage nodes increase and decrease.

17. The method of claim 14, further comprising:

adjusting a voltage level of the transmission node so as to be substantially identical to a target voltage.

18. The method of claim 14, wherein the first threshold voltage pair includes the first upper limit voltage and the first lower limit voltage, wherein the second threshold voltage pair includes the second upper limit voltage and the second lower limit voltage, wherein the first threshold voltage pair is associated with a first maximum power point of a first energy source among the plurality of energy sources, and wherein the second threshold voltage pair is associated with a second maximum power point of a second energy source among the plurality of energy sources.

* * * * *